United States Patent Office 3,563,109
Patented Feb. 16, 1971

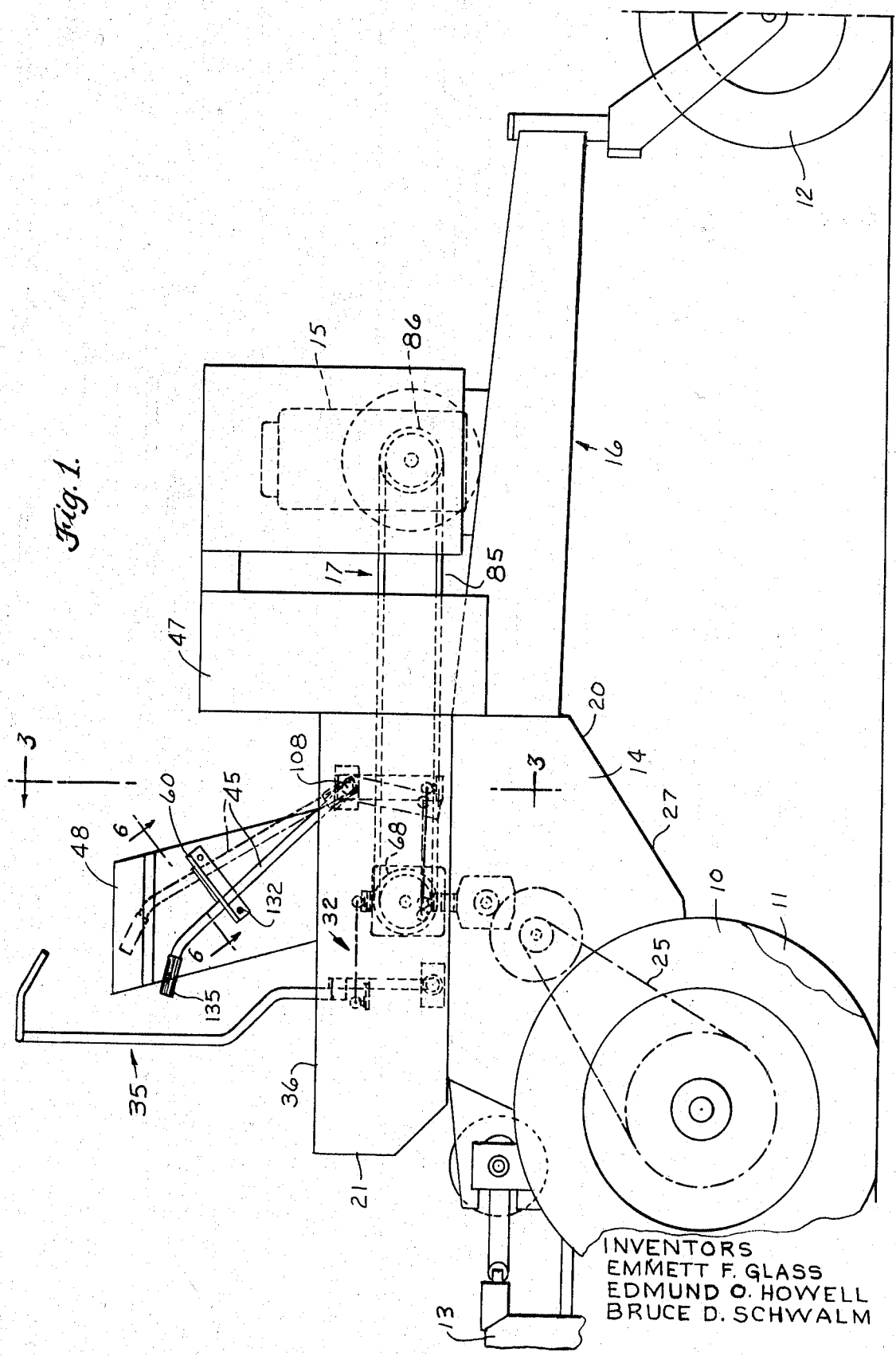

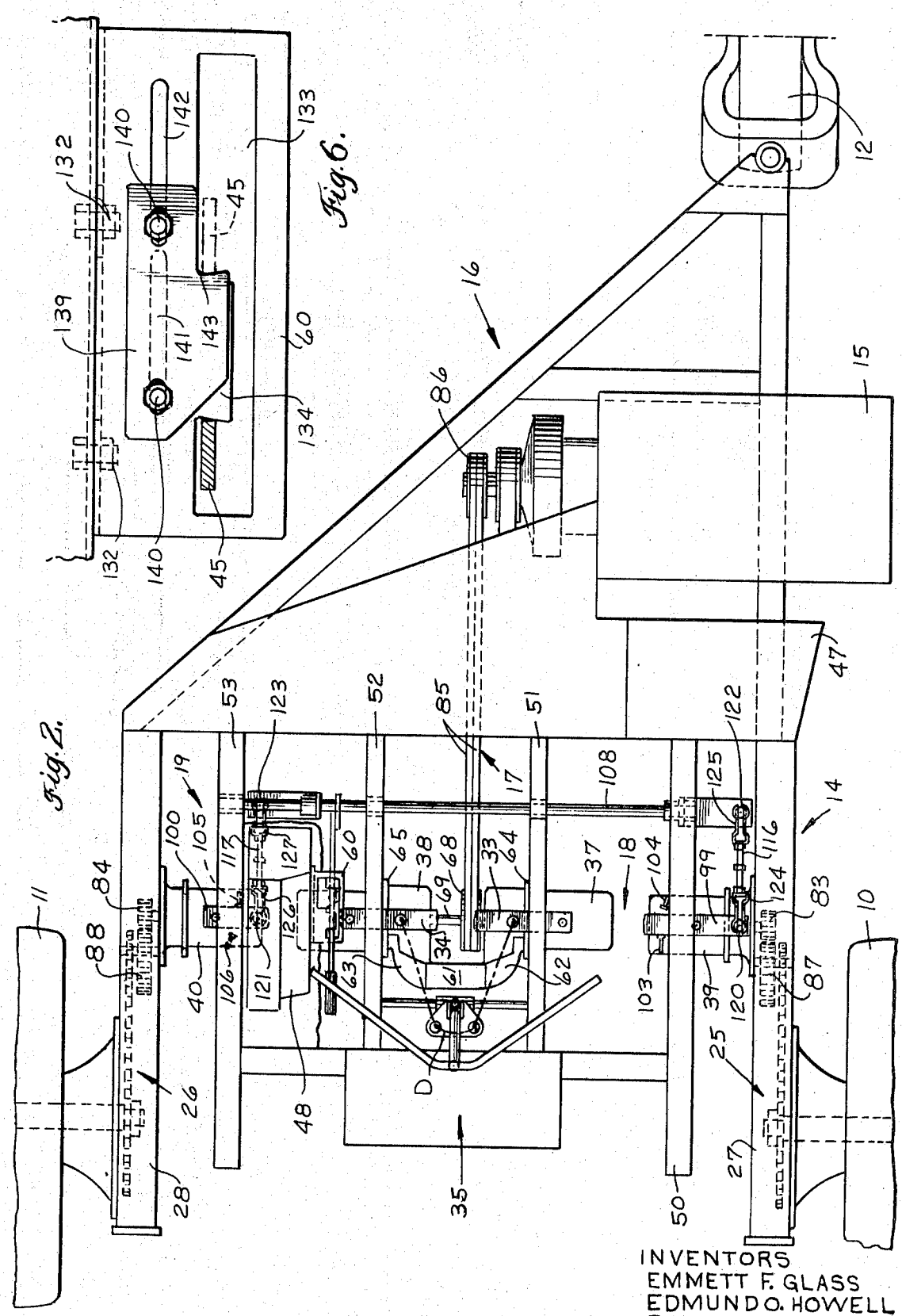

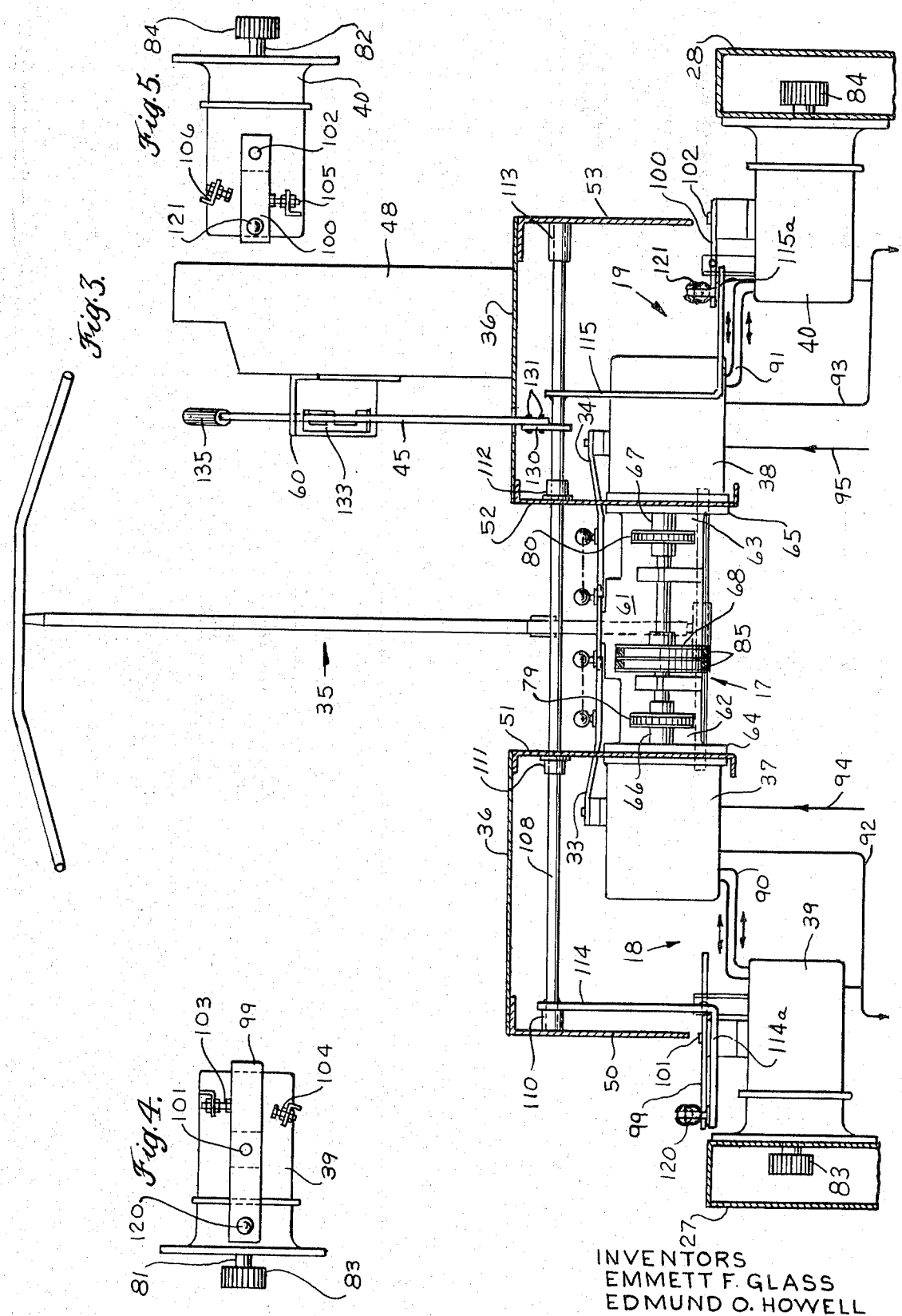

3,563,109
TWO RANGE STEERING AND SPEED CONTROL MECHANISM FOR A DUAL HYDRAULIC TRANSMISSION SEPARATELY DRIVING TWO WHEELS OF A TRACTOR
Emmett F. Glass, Akron, Edmund O. Howell, New Holland, and Bruce D. Schwalm, Leola, Pa., assignors to Sperry Rand Corporation, New Holland, Pa., a corporation of Delaware
Filed Apr. 14, 1969, Ser. No. 815,712
Int. Cl. G05g 9/00
U.S. Cl. 74—470
8 Claims

ABSTRACT OF THE DISCLOSURE

A tractor has two spaced front wheels and a trailing tail wheel and has an operating lever controlling two sets of hydraulic pumps and motors independently driving a respective front wheel. The motors are on opposite sides of the tractor and have pintle arms set by lever means under resilient pressure against stops in one of two speed ranges.

BACKGROUND OF THE INVENTION

This invention relates to means for operating two hydraulic transmissions separately connected to the front wheels of a tractor and is directed particularly to means for setting the motors of the transmissions in high or low speed conditions.

Tractors with cutting headers are subjected to many operating conditions. The header carrying tractors are normally moved through fields for cutting crops. However, the tractors are driven from field to field or from parking locations to fields for cutting. In these movements the header of the tractor is held in a raised condition so the tractor can move at a greater speed than when moving through a field when cutting crops. The tractor drives are, therefore, set for a high speed operation and for a low speed operation. In the case of the hydraulic transmissions the different speed ranges are attained by varying the position of the swash plate of the hydraulic motors. The swash plates can be set for a low range of from 0–8 miles per hour or may be set at a high range from 0–12 miles per hour. In the lower range the tractor transmission has a higher torque for forcing the tractor through the crops. The position of the swash plates of the hydraulic motors, is controlled by a lever adjacent to the operator's seat. The lever is positioned to one side of the tractor so that the distances from the hydraulic motors at the opposite sides of the tractor are different. This results in inequality of pressures being applied to the swash plates of the hydraulic motors. Further difficulty is encountered in that the resiliency of the linkage system permits the swash plates to chatter. This chatter occurs when high torques are suddenly applied or when sudden changes in the direction of the tractor occur. The chatter of the pintle arms of the motor would cause erratic steering and unsmooth movement of the tractor. This occurs in both the high and low ranges.

It is the purpose of this invention to reduce or eliminate the chattering of the hydraulic motors on the sudden applications or torques or changes in directions of speed and to equalize the pressures applied to the pintle arms or swash plates of the hydraulic motors.

OBJECTS AND SUMMARY OF THE INVENTION

An object of the invention is to provide for a control mechanism that operates two hydraulic transmissions for driving front wheels of the tractor with a high and low range of speeds without chatter.

Another object of the invention is to provide a control mechanism for two hydraulic transmissions that has means for setting the transmissions at high or low ranges of speeds with an equal application of pressures.

In summary the two ranges of speed controls for dual hydraulic transmissions comprises a two position lever connected to the pintle arms of the hydraulic motors by levers of different deflection characteristics to deflect same amount and apply the same pressure on engaging one range position and other range position stops for pintle arms of hydraulic motors under an applied load of the positioning lever at the operating controls.

Other and further objects and advantages of this invention will be apparent from the following specification and appended claims taken in connection with the drawings which illustrates the preferred embodiment of the invention.

BRIEF DESCRIPTION OF THE DRAWING

FIG. 1 is a side view of a tractor with separately driven front wheels.

FIG. 2 is a fragmentary top view of the main frame with the operating deck omitted.

FIG. 3 is an enlarged fragmentary sectional view of the upper portion of the main frame and illustrates the control mechanism for the hydraulic pumps and motors.

FIGS. 4 and 5 are top views of the hydraulic motors.

FIG. 6 is a top sectional view of the latch plate for the two range positioning lever.

INTRODUCTION

A self-propelled tractor has two front drive wheels 10, 11 on opposite sides of the tractor and a trailing tail wheel 12. A header 13 is mounted on front of the main frame 14 by a linkage mechanism (not shown). The tractor and the front wheels 10, 11 are driven by a gasoline engine 15 mounted on the triangular shape engine supporting frame 16. A belt and pulley drive 17 connected to two sets 18, 19 of hydraulic pumps and motors for a respective wheel. The gear and chain drives 25, 26 in the side casings 27, 28 connect the motors to the respective wheels. The speed and direction of the tractor is controlled through the linkage mechanism 32 connected to the pintle arms 33, 34 of the hydraulic motors. The linkage mechanism 32 has an operating lever 35 extending upwardly above the operating deck 36 for controlling the forward and rearward speeds of the tractor by longitudinal movement in a vertical plane. The tractor may be turned either left or right or may be spun by rotating the operating lever 35 about its axis. The hydraulic motors 37, 38 may be set in a high range of speeds or a low range of speeds by the positioning lever 45 and associated linkages.

FRAME MEANS

The main frame 14 comprises a lower portion 20 and an upper portion 21. The casings 27, 28 form the sides of the lower portion 20. The upper portion 21 has four longitudinally extending beams 50, 51, 52, 53 mounted on the lower portion 20. On top of the longitudinal beams 50, 51, 52, 53 is the operator's deck 36 with the operating lever 35 and positioning lever 45 extending above the deck. The engine 15 is intermediately mounted on the engine supporting frame 16 and a casing 47 is mounted adjacent to the main frame for housing the gasoline tank and other operating elements of the tractor. The front guard rail and other operating elements of the tractor have been omitted. The operating lever 35 is at the center of the tractor and the tractor driver may stand or sit behind the operating lever 35 for controlling the direction and speed of the tractor. The positioning lever 45 for setting the motors 39, 40 in either a high speed range or a low speed range is offset from the center on the right side of the operator. A control console 48 is mounted to the right of the operator for containing the various meters and levers for operating the tractor. The positioning lever 45 is situated in the latching plate 60 mounted on the side of the console. Between the two center beams 51, 52 of the upper portion is a generally U-shape casting 61 extending between the beams. The casting has rearwardly extending arms 62, 63 and flanges 64, 65 secured to the center beam for supporting the hydraulic pumps 37, 38.

DRIVE MEANS

The hydraulic pumps 37, 38 are mounted on the flanges 64, 65 of the U-shaped casting 61 and have driven shafts 66, 67 extending inwardly in axial alignment. The driven pulley 68 of the belt and pulley drive 17 from the engine is mounted on a shaft 69 rotatably supported in the bearing means 75, 76 securely held by the L-shaped portions 77, 78 of the casting 61. The pulley shaft 68 is in axial alignment with the shafts 66, 67 of the pumps 37, 38 and is connected respective thereto by flexible couplings 79, 80. The flexible couplings accommodate any slight misalignment of the shafts. The two belts 85 coupled to the driven pulley 68 are connected to the driving pulley 86 on the engine 15. The pumps 37, 38 are of the axial type having swash plates (not shown) for varying the strokes of the pumps. The hydraulic pumps 37, 38 are connected to the hydraulic motors 39, 40 by the two sets of high pressure lines 90, 91 shown in FIG. 3. The direction of flow of fluid depends upon the direction of movement of the operating lever. The lines 92, 93, 94, 95 circulate a portion of the fluid to an oil reservoir (not shown) and an oil filter (not shown).

The pintle arms 33, 34 on top of the hydraulic pumps 37, 38 are pivotally mounted thereto for varying the angular position of the pump swash plates and thereby the stroke of the pistons. Forward movement of the pintle arms rotates the swash plates so that the front wheels drive forwardly. A rearward movement of the pintle arms from the neutral rotates the swash plates so that the front wheels drive rearwardly. With the pintle arms in a neutral position the wheels 10, 11 are stationary. A differential between the speeds of rotation of the front wheel may be produced by rotating the operating lever 35.

The hydraulic motors 39, 40 are mounted on the inner sides of the casings 27, 28 with the output shafts 81, 82 extending into the casings 27, 28 and having spur gears 83, 84 meshing with the larger gears 87, 88 coupled to the chain drives 25, 26.

SPEED RANGE CONTROL MECHANISM

The speed of the hydraulic motors is controlled through the pintle arms 33, 34 of the hydraulic pumps. The motor pintle arms 99, 100 may be set in two positions, a high speed position and a low speed position. In the high position the pintle arms of the pumps can vary the speed over a range of 0-12 miles per hour and in the low speed position the pintle arms of the pumps can vary the speed over a range of 0-8 miles per hour.

Considering the hydraulic motors in greater detail the pintle arms 99, 100 pivot about pins 101, 102, respectively, and on the same sides of the pins. The motors 39, 40 have adjustable stops 103, 104 and 105, 106, respectively, for setting the pintle arms 99, 100 at the high and low speed ranges. Pintle arms engaging stops 104, 106 are in the high range position and the pintle arms on engaging stops 103, 105 are in the low range position.

The position lever 45 through the linkages sets the pintle arms 99, 100. The linkages comprise the rod 108, the L-shaped members 114, 115 and links 116, 117. The rod 108 extends transversely across the upper portion and rotatably mounted with bearings 110, 111, 112, 113 on the beams 50, 51, 52, 53. L-shaped members 114, 115 extend downwardly from the rod to the links 116, 117 connected to the motor pintle arms in the lower frame portion. The horizontal portions 114a, 115a are on approximately the same level as the pintle arms 99, 100 and are connected thereto by adjustable links 116, 117. The pintle arms have balls 120, 121 and the horizontal portions have balls 122, 123. The links 116, 117 have clamps 124, 125 and 126, 127, respectively, for rotatably gripping the respective balls.

The lever 45 is on the right side of the tractor and fixedly secured to the rod 108 by the plate 130 and fastening means 131. Movement of the lever between two positions over a limited arc swings the motor pintle arms 99, 100 between the adjustable stops.

The latch 60 comprises an L-shaped bracket secured to the console 48 by fastening means 132. In the portion extending perpendicularly from the console is a slot 133 with a projection 134 forming a catch for the lever 45. The lever 45 extends through the slot and has a handle 135. In the forward or low range position the rod 108 rotates the L-shaped members 114, 115 rearwardly to pivot the pintle arms 99, 100 to engage the stops 103, 105. On rearward movement of the lever 45 the L-shaped members 114, 115 are rotated forwardly and the pintle arms 99, 100 are rotated to engage stops 104, 106.

The pintle arms engage the stops before the lever is completely past the projection 134. Continued movement of the lever twists the rod 108 and places the L-shaped members 114, 115, links 116, 117 and pintle arms 99, 100 under stress. The rearward or high speed range position is adjustable. Plate 139 is secured to the bracket 60 by fastening means 140 extending through slots 141, 142 parallel to the movement of the lever. The plate 139 has a notch 143 corresponding to the rear edge of the projection 134. The notch may be set to correspondingly place the lever 45, rod 108, L-shaped members 114, 115, links 116, 117 and pintle arms 99, 100 under stress against the stops 104, 106. The L-shaped member 114 is of a heavier gauge steel than the L-shaped member 115 closer to the lever. The member 114 will deflect less than member 115 and compensate for the greater force and deflection of the rod 108 due to the location of the lever 45 on the right side of the tractor and closer to the member 115.

The operating lever 35 can vary the pintle arms of the motors through the range of control with the pintle arms 99, 100 of the pumps in either the high range or low range set by the motors.

FEATURES OF THIS INVENTION

The front wheels are separately driven by hydraulic motors that are settable at two speed ranges. The motors are varied over these ranges by varying the positions of the pump pintle arms. These pintle arms are controlled by the tractor operator by movement of the centrally located operating lever in a vertical longitudinal plane and rotated about its axis for turning the tractor.

The motor pintle arms are positionable by the lever 45 to the right side of the operator. The lever is locked in the forward or rearward position by a catch. In either position the motor pintle arms are held under stress or pressure of the torsion of the rod 108 and the L-shaped members 114, 115. This places a positive pressure on the motor pintle arms to hold them in place and resist the hydraulic pressure that may cause them to chatter. The heavier and thicker lever 114 on the left side has less resiliency than the inner lever 115 on the right. This difference equalizes or matches the pressures applied to the pintle arms so that substantially equal pressures are applied to the arms. This equalizes the reaction of the pintle arms to the motor drive and provides a smooth transmission of power to the wheels.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A mechanism for setting the outputs of two hydraulic motors on opposite sides of a tractor at one of two speed ranges comprising pintle arms pivotally mounted on a respective side between two positions for setting said motors at one of two speed ranges, a rotatably mounted rod extending transversely from one motor to the other, members fixedly attached to said rod adajcent a respective motor, links connecting said pintle arms and said members to simultaneously move said pintle arm from one position to another on rotation of said rod, a lever fixedly attached to said rod substantially closer to one motor than the other to rotate said rod and said pintle arms between two speed range positions and said rod, members, links and pintle arms forming first and second actuating means to compensate for the offset of said lever for application of substantially the same pressure to said pintle arms.

2. A mechanism as set forth in claim 1 wherein catch means are provided engaged by said lever to hold said lever, rod, members, links and pintle arms under pressure in each position for maintaining smooth operation.

3. A mechanism as set forth in claim 1 wherein said member associated with the closer motor has a greater flexibility than the member associated with the further motor.

4. A mechanism as set forth in claim 1 wherein said first actuating means including said pintle arm of said furthest pump comprises matching means and applies the same pressure to said respective pintle arm as said rod, member and link connected to said closer pintle arm.

5. A mechanism as set forth in claim 1 wherein said members are L-shaped and said member closer to said lever being more flexible than the member furthest from said lever to compensate for differences in deflection.

6. A mechanism for setting the outputs of two hydraulic motors on opposite sides of a tractor at one of two speed ranges comprising control means on said motors positionable between two speed ranges, a positioning lever closer to one motor than the other, a first linkage means coupling said lever and said control means of the furthest motor and a second linkage means coupling said lever and said control means of the closest motor, said first and second linkages including means matching said linkages to provide said linkages with the same overall deflection characteristics so that said linkages apply the same pressures to said control means.

7. A mechanism for setting the outputs of two hydraulic motors on opposite sides of a tractor at one of two speed ranges comprising two pintle arms on a respective motor positionable between two settings, a rod extending transversely from one side to the other and being rotatably mounted, a lever attached to and extending normally from said rod for rotating said rod, L-shaped members mounted on said rod with portions extending downwardly and portions extending parallel to said rod for rotation by said rod, links between a respective pintle arm and parallel portion for rotating said pintle arms on actuation of said lever, said lever being attached to said rod closer to one motor than the other and said member at said closer motor having greater flexibility than said member at said further motor for substantially equal deflection characteristics and application of pressures to said pintle arms by said rod, members and links.

8. A mechanism as set forth in claim 7 wherein catch means are provided having two positions for holding said lever, said lever fitting in said catch means and movable between the two positions to hold said rod, L-shaped members, links and pintle arms under pressure in each position.

References Cited
UNITED STATES PATENTS 2,694,319    11/1954    Johnson    74—470X
3,181,389    5/1965    Richard    74—480

MILTON KAUFMAN, Primary Examiner

U.S. Cl. X.R.
74—480; 180—6.48